Figure 1:
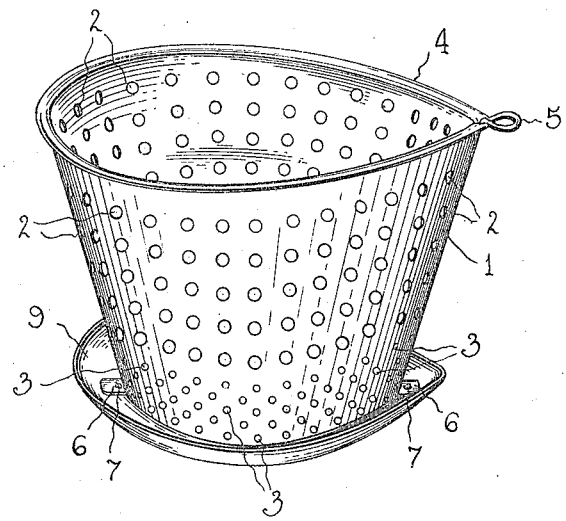

E. FISHER.
SINK STRAINER.
APPLICATION FILED FEB. 11, 1915.

1,160,869.

Patented Nov. 16, 1915.

Witnesses
Chas. W. Stauffiger
Karl H. Butler

Inventor
Elmer Fisher
By
Attorneys

UNITED STATES PATENT OFFICE.

ELMER FISHER, OF DETROIT, MICHIGAN.

SINK-STRAINER.

1,160,869.  Specification of Letters Patent.  Patented Nov. 16, 1915.

Application filed February 11, 1915. Serial No. 7,510.

*To all whom it may concern:*

Be it known that I, ELMER FISHER, a citizen of the United States of America, residing at Detroit, in the county of Wayne and State of Michigan, have invented certain new and useful Improvements in Sink-Strainers, of which the following is a specification, reference being had therein to the accompanying drawings.

This invention relates to a portable strainer for sinks, and the primary object of my invention is to furnish a strainer with a closed bottom and gutter which will preclude any possibility of the contents of the strainer dripping, particularly when the strainer is carried from a sink to a garbage can or other receptacle to be emptied.

Another object of my invention is to furnish a portable strainer with a permanent drip pan that will serve as a base for the strainer when set upon a table or other support, also as a protecting shield for the lower end of the strainer to prevent the bottom thereof from being indented or otherwise injured.

A further object of this invention is to improve the present type of sink strainer by providing the same with a strong and durable imperforate bottom which forms a gutter around the wall of the strainer and prevents solid matter or drippings from escaping and in all probability clogging a sink or the drain opening thereof.

The above and other objects are obtained by a mechanical construction that will be hereinafter specifically described and then claimed, and reference will now be had to the drawing, wherein—

Figure 2:
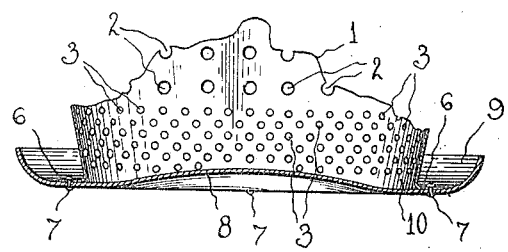

Figure 1 is a perspective view of a strainer in accordance with this invention; and Fig. 2 is a vertical sectional view of a portion of the same.

A strainer in accordance with this invention comprises a substantially inverted frusto-conical shaped shell 1 that has the walls thereof provided with a series of openings or perforations 2 and a series of openings or perforations 3, the latter being much smaller than the former and located at the lower edges of the shell.

At the large or upper end of the shell 1 the edges thereof are rolled, as at 4 and reinforced or stiffened by a wire which provides a suspension loop or hanger 5 by which the strainer can be suspended in a sink, preferably in a corner thereof, from a nail or pin at the upper edge of the sink.

The small or lower end of the shell 1 is provided with apertured lugs 6, which are preferably integral with the shell and laterally disposed. Riveted or otherwise connected to these lugs, as at 7 is a convexo-concave imperforate bottom plate 8 and the peripheral edges of said bottom plate project outwardly from the walls of the shell and are curved upwardly to form a gutter 9. This gutter is exteriorly of the shell and the bottom plate coöperates with the walls of the shell in forming an annular interior gutter 10. These two gutters coöperate in holding drippings in suspension and preventing liquid matter from dripping from the strainer, particularly when being carried from a sink to a garbage can or receptacle. The convexity of the bottom plate tends to deflect liquid matter toward the gutters 10 and 9 and the small perforations 3 are adapted to prevent coffee grounds and small particles of matter from passing into the exterior gutter 9.

The bottom plate 8 affords a substantial base for the strainer thereby precluding any possibility of the strainer tilting or accidentally upsetting when placed upon a table or support, as is often necessary when removing the lid of a garbage can. The bottom plate is pressed and stamped from a single piece of material and I attach considerable importance to the simplicity of construction and to the fact that a material advantage is gained without increasing the cost of an ordinary sink strainer.

The article in its entirety can be finished to make the same non-corrodible and to present a neat appearance.

What I claim is:—

1. As a new article of manufacture, a perforated sink strainer having a permanent bottom plate providing inner and outer gutters at the lower end of said strainer.

2. As a new article of manufacture, a perforated sink strainer having a permanent convexo-concave bottom plate providing inner and outer annular gutters at the lower end thereof.

In testimony whereof I affix my signature in presence of two witnesses.

ELMER FISHER.

Witnesses:
KARL H. BUTLER,
ANNA M. DORR.

Copies of this patent may be obtained for five cents each, by addressing the "Commissioner of Patents, Washington, D. C."